Aug. 13, 1935.   H. C. MARTIN ET AL   2,010,873
ABRASIVE ARTICLES AND METHOD OF MANUFACTURING THE SAME
Filed Dec. 30, 1932
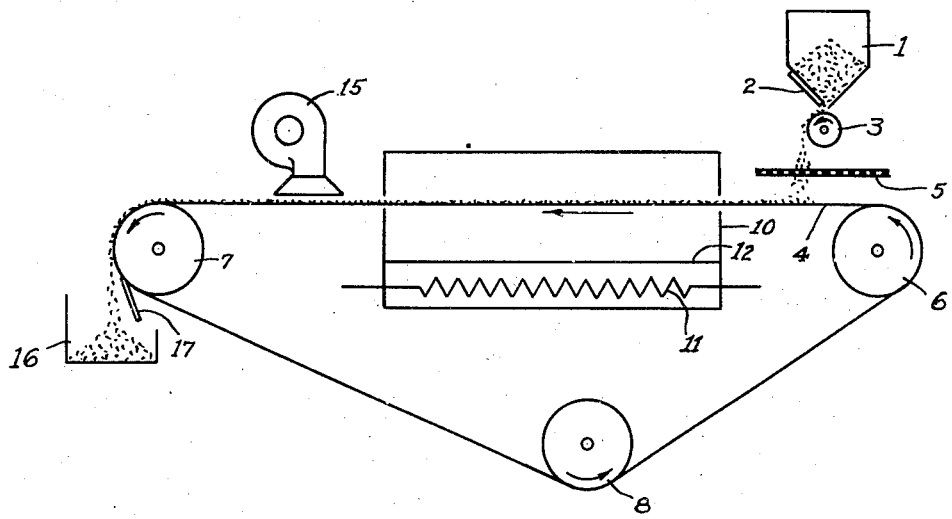
INVENTORS
HARRY C. MARTIN
FREDERICK A. UPPER
BY
ATTORNEY Patented Aug. 13, 1935

2,010,873

UNITED STATES PATENT OFFICE 2,010,873

ABRASIVE ARTICLES AND METHOD OF MANUFACTURING THE SAME

Harry C. Martin, Niagara Falls, N. Y., and Frederick A. Upper, Niagara Falls, Ontario, Canada, assignors to The Carborundum Company, Niagara Falls, N. Y., a corporation of Pennsylvania Application December 30, 1932, Serial No. 649,604

15 Claims. (Cl. 51—280)

This invention relates to improved abrasive articles and methods of manufacturing the same. More particularly, the invention is concerned with abrasive articles bonded with synthetic resins.

One object of the invention is to make improved abrasive articles. Other objects of the invention are to develop an improved method for making resin bonded abrasive articles, to make an intermediate product for use in the manufacture of abrasives, and to provide apparatus for carrying out the invention.

Resin bonded abrasive articles have heretofore been made by one of two general methods. According to the so-called "hot press" process the abrasive grains are mixed with a powdered resin and the mixture is first heated to melt the resin and cause it to adhere to the grain and is then cooled. The cooled mixture is in the form of a continuous mass which must be broken up into small particles before it is placed in the mold. In breaking up the mass, some of the resin becomes detached from the grain and this is usually caused to adhere to the grain by wetting the mixture with a very small quantity of some suitable liquid such as linseed oil. Various modifications of this process have been used such as heating the grain and adding the powdered resin to it, mixing, cooling and breaking up and similar minor variations which would be more or less obvious but which are fundamentally the same.

The hot press process provides an intermediate product suitable for molding which consists of abrasive grains to which are attached what might be described as lumps of resin and a small quantity of resin powder which has been formed by the step of disintegrating the mixture and is attached by reason of the wetness of the oil.

Since the resin in a product made by the hot press process is of the type obtained by fusing the ordinary powdered resin of commerce, it is practically non-adhesive at ordinary temperatures. Articles are formed from such a mix by putting the mixture into a mold and pressing in a hot press for a time sufficient to harden the resin. As an alternative, they may be removed from the mold after the resin has softened to the degree necessary to cause cohesion between the lumps of resin which are attached to the grain and the curing of the resin can be completed in an oven.

Articles made by the hot press process are very dense and of low porosity because the resin is soft when the article is being pressed and is therefore caused to flow into a substantially continuous mass. The articles are of such a structure that they cut slowly and develop considerable heat in use and are therefore suitable for polishing and similar operations in which little stock has to be removed from the work rather than for use in such processes as the snagging of fins from castings where a fast and free cutting wheel is required. The hot press process is used very little and is applicable, commercially, only to very thin articles; e. g., approximately one eighth inch thick or less.

The other general method of making resin bonded abrasives is that known as the cold molding process. According to that process, as originally disclosed to the public in a patent to Brock, No. 1,537,454, abrasive grains are mixed with a powdered resin and the mixture is then moistened with a resin solvent, such as furfural, which plasticizes the resin and makes it sufficiently tacky and adhesive so that an article can be formed in a press from a mix at room temperature and the article can be removed from the mold and cured as in the hot press method.

An improvement which was made in Brock's process, and which materially simplified molding practice, made more uniform articles and made it possible to cold mold very thin articles, is described in a patent to Martin, No. 1,626,246.

According to the Martin process, the abrasive grain is first moistened with a resin solvent or plasticizing agent, such as furfural, and a dry powdered resin is then added to the moistened grain and mixed therewith. In the operation of this process the solvent which coats the abrasive grains is presumed to dissolve the resin which is immediately in contact with it and this thick solution then acts as an adhesive which attaches the remainder of the finely powdered resin to the granules. Regardless of whether or not the process proceeds according to the theory given, the facts are that when the technique described in the Martin patent is followed, a mix is obtained which consists of abrasive grains coated with the resin, the external surface of which is in powdered form. The granules are dry to the feel; the mix can be screened whereby it can be actually separated into individual resin coated granules and upon squeezing in the hands the granules adhere as a mass which can again be crumbled. When such a mix is pressed at ordinary temperatures, an article is formed which can be removed from the mold and cured in an oven, much the same as is done with one made by the Brock process.

Still another process for cold molding comprises the use of a liquid heat-hardenable resin as the plasticizing agent in a process somewhat similar to the Martin process. This method is described and claimed in a copending application by Normal P. Robie, Serial No. 550,269, filed July 11, 1931.

While articles made by either the Brock, the Martin or the Robie process, and particularly by the two latter processes, are relatively open, porous and free cutting as compared to those made by a hot molding process, and although the Martin process is a distinct improvement over the Brook patent because it makes a dry granular mix instead of a sticky, tacky one, even the Martin process is open to a number of objections which we have been able to overcome by our improvement. For example, mixtures made by the Martin process must be molded within a few hours after they are made and cannot be held over from one day to the next. They are rather susceptible to changes in temperature and humidity, and it has been found to be necessary to make up and keep such mixtures in an atmosphere controlled as to temperature and humidity as is described and claimed in a copending application Serial No. 548,263, filed July 1, 1931. Furthermore, in articles made by the Brook process the bond flows during the curing step, and in the those made by the Martin process the bond is pressed between the grains to some extent and tends to concentrate somewhat between the granules, to that extent reducing the porosity or "openness" of the article.

We have discovered that if a mixture be first made according to the process described in the Martin patent (1,626,246) or in the Robie application, and the mixture is then separated into individual granules, for example by screening, and if these individual granules are then heated for a few minutes at a temperature of about 350° F., the resin and solvent or plasticizing agent on the grains are converted into a homogeneous bond which completely surrounds each grain and will remain in this position through the rest of the process of making a finished article. While we do not wish to be limited by the theory as to how this action occurs, for purposes of explaining our invention we will say that we presume that the resin dissolves in the solvent to form a very concentrated solution and at the same time the resin is also presumably advanced somewhat toward the final stage so that it is more viscous and less likely to flow during the final curing process. The liquid resin of the Robie application has a solvent action upon the solid powdered resin and therefore acts as a resin solvent somewhat like the furfural of the Martin patent. The furfural of the Martin patent and the liquid resin of the Robie application both serve as liquid plasticizers in softening or partially dissolving the powdered solid resin coating on the grains.

In carrying out our process we maintain the grains in a substantially separated condition, as for example by sprinkling them in a substantially single layer on a travelling belt, so that no appreciable aggregation of the grains occurs when the coated grains are heated although, in practice, occasional clusters of a few grains may be formed.

We will now give an example to illustrate the method of making an abrasive article in accordance with our process. It is to be understood that this example is for illustrative purposes only and is intended to be in no way limitative.

880 parts by weight of No. 36 grit fused alumina abrasive grains are wet with 30 parts by weight of a liquid phenol condensation product resin such as that known to the trade as "No. 1373 'Redmanol'." After mixing carefully to assure a substantially uniform distribution of the liquid over the grains, 90 parts of the finely powdered fusible and soluble phenolic condensation product resin which is known to the trade as "'Redmanol' CR—0214" are added to the moistened grain and thoroughly mixed therewith. The product obtained by this process, which is the material used for forming an article according to the process of the Robie application, is distributed on a suitable plate in such a manner that the granules are substantially all separated one from another and the plate is placed in an oven, the temperature of which is approximately 350° F. After approximately two and one half minutes exposure to the temperature in the oven, it will be found that the previously solid resin has melted and become homogeneously mixed with the wetting solution and the granules are then removed from the oven and cooled to room temperature. In making up an abrasive article, this intermediate product is moistened with about one cubic centimeter of a resin solvent such as benzaldehyde and the mixture, which is entirely granular and not perceptibly adhesive, is placed in a suitable mold and pressed at approximately 2000 pounds per square inch. The formed article is removed from the mold, placed on a steel plate, and cured to final form by placing in an oven, the temperature of which may be initially about 250° F. The temperature of the oven is then raised to 350° F. at the rate of about 25° F. per hour, and is maintained at this value for about 10 to 15 hours, depending upon the size of the abrasive article. After curing, the article may be cooled and subsequently finished in the usual manner.

Where it is desired to incorporate inert fillers such as pulverized flint or the like, we have found it desirable to mix the fillers with the powdered resin, such as the "Redmanol" CR—0214 above mentioned, prior to mixing the resin with the moistened grain. Due to the adhesiveness of the resin in contact with the moistened grain, these fillers are attached to the grain along with the undissolved resin and are thus incorporated into the bond when the mixture is heated to melt the resin.

Articles made by our improved process have been found to be unusually porous because there is no loose bond in the mixture which can move into the spaces between the grains and thereby reduce the pore space or cause a variation in density of different portions of the finished article. Unless the bond is permanently fixed on the grain, it will be forced into the pores when the mixture is pressed and will also tend to flow when the article is heated to cure the bond. Our process eliminates the uncertainties which follow from such uncontrollable movement of the bond.

Because the bond is permanently fixed in place around the grain in articles made by our process, such articles are even more open and free cutting than those made by the Brock or the Martin process. We have therefore advanced the art still further by providing resin bonded abrasive articles which have a greater degree of openness than it was formerly possible to make. Furthermore, it is possible to compress articles made by our process to a higher degree than is practical with the older methods thereby obtaining articles of higher apparent density and greater abrading life without much loss in cutting ratio. If extremely high pressures are used in carrying out the older process, the articles swell and bloat when they are cured, presumably because the gases evolved in the curing process cannot escape freely.

We have found that this difficulty is overcome when our process is used and that the cured bond is denser and the pores of the cured article are larger than obtains when the older process is employed.

The proportion of solvent and the time and temperature used in our precuring process have been found to be dependent both upon the size of the abrasive granules and the proportion of resin used. The proportion of solvent will also vary somewhat with different solvents. These factors are readily determinable by one skilled in the art but by way of example we are tabulating below some values which we have found to be suitable. It will be appreciated that a great many variations in grit size and bond content can be made and it is therefore impractical to attempt to give a complete table. The following figures illustrate the effect of changes and can be used as a starting point from which to determine the most desirable proportions for other combinations. The solvent here used is benzaldehyde, the grain being fused alumina.

| Grit size | % bond | Temp. °F. | Minutes at temp. | cc. solvent per 1,000 grams of mix |
|---|---|---|---|---|
| 12 | 12 | 350 | 4 | 26 |
| 12 | 14 | 350 | 4 | 32 |
| 36 | 12 | 350 | 2½ | 22 |
| 36 | 14 | 350 | 2½ | 26 |

Although we have illustrated the operation of our process by citing examples involving phenolic resins because resins of this type are most commonly used, the process is equally satisfactory for use with other types of resins such as alkyd resins or shellac. Similarly, other types of solvents including, for example, other liquid heat-hardening resins and solvents which volatilize during the precuring process may be used instead of the specific solvents mentioned in the examples.

While our process is not dependent upon the use of any particular form of apparatus, we have found that one such as is illustrated diagrammatically in the drawing is suitable.

Referring to Figure 1, a hopper 1, for holding the grain prepared in accordance with the process of the Martin patent is provided with a gate 2 and a conventional feed roll 3 for controlling the supply of grain which is fed onto the belt 4 through the screen 5. The belt 4, which may be of thin steel or other suitable material, encloses the pulleys 6, 7 and 8 and is caused to move in the direction indicated by the arrow by reason of the rotation of the pulley 8 which is externally driven by means not shown in the drawing, the speed of the belt preferably being variable. The belt, carrying the individual grains so positioned that the granules are in a substantially separated condition, travels through the heat chamber 10 which is provided with a heating element 11, such as an electrical resistance unit (although it may obviously be heated with gas or by any suitable means), and a baffle 12 to assist in distributing the heat uniformly through the chamber. Upon leaving the heat chamber, the grains are cooled by an air blast from the blower 15 and drop into a receptacle 16. Cooling may be assisted by water cooling the pulley 7 and, if desired, the receptacle 16 may be replaced by a belt so that the grains can be cooled sufficiently to prevent cohesion between grains before they are allowed to contact each other. The grain may be removed from the belt by the use of a scraper 17 which presses against the belt where it contacts the pulley. The scraper may obviously be replaced by a rotating or stationary brush or other equivalent.

Another method which we have used for precuring the bond comprises dropping the coated granules vertically downward through a heated tube whereby the resin is melted during the passage through the heated zone after which the material is cooled before the grains come into contact with each other.

Since the resin is somewhat advanced toward the final stage during the precuring process and is, at the same time, mixed uniformly with the plasticizer, the intermediate product made by out process consists of individual abrasive grains covered with a bond in a layer of substantially uniform thickness which is relatively hard and is not sticky or tacky at ordinary temperatures. The coated granules may be kept for weeks, and so far as we know indefinitely, without appreciable change or deterioration. They are not perceptibly affected by the usual changes in atmospheric temperature and humidity even when exposed to temperatures as high as 100° F. and humidities as high as 125 grains of water per pound of dry air whereas the unheated Martin mixes must be kept below about 70° F. and about 80 grains of water per pound of dry air and are useless for molding purposes after a few hours even when they have been kept at low temperatures and humidities.

Some of the advantages of our process may be summarized as follows:

1. Articles made by our process are more open and free cutting than those made by processes heretofore known because the bond is distributed and remains around the grain and does not flow into the interstices between the grains as it does in other processes.

2. It is possible to duplicate articles much more closely than can be done by other processes because the distribution of the bond is under positive control and the bond is not haphazardly spread both around and between the grains as it is in articles made by other processes.

3. Our bond-coated intermediate product can be stored without deterioration and it is therefore unnecessary to keep a close balance between the mixing and the pressing departments or to discard any mixture left over at the end of a day as must be done with mixes made by the Brock or the Martin process.

4. The intermediate product is not susceptible to changes in the temperature and humidity of the atmosphere. It is therefore not necessary to artificially condition the atmosphere in press rooms and the like, in contrast to the behavior of mixes made by the Martin process which are materially affected by atmospheric changes.

5. Articles can be cured much more rapidly and with no danger of spoilage by reason of the bond flowing in the article because the bond is partially cured when the isolated grains are heated to melt the resin around the grain in the production of the intermediate product. Articles made from mixes made by the Martin or Brock process must be very carefully heated in the earlier stages of the cure to prevent flowage of the bond to the bottom or even out of the article.

6. Decidedly harder articles can be made by our process than have heretofore been known. This is true because the bond is partially cured during the preliminary heating so that it does not flow during the curing step. It is therefore possible to use more bond and higher pressures without spoilage by reason of bond flowage during the curing step or displacement during the pressing step. Where fillers are used they are better distributed than is the case with articles made by other processes.

7. The effective life of abrasive articles made by our process is considerably greater than that of articles made by processes heretofore known because the grains are all equally and strongly bonded together by reason of the fact that the bond is retained in position around the grains. In articles made by other processes the bond flows more or less haphazardly into the interstices between grains, and the grains are therefore much less positively and firmly held in place.

While we have illustrated our invention by numerous examples, it is not intended that it should be limited to the particular steps, materials or form of apparatus given in the examples but rather that it should be defined by the appended claims.

We claim:

1. The method of manufacturing material suitable to be molded into abrasive articles which comprises coating abrasive granules with a resin solvent, applying powdered resin to the solvent coated granules, heating the granules while in separated condition to liquefy and partially cure the resinous coating on the granules, and cooling the granules.

2. The method of manufacturing material suitable to be made into abrasive articles which comprises coating abrasive granules with a powdered resin, heating the granules while in separated condition to liquefy the resinous coating on the granules, and cooling the granules in separated condition until the resin has solidified.

3. The method of making a loose mass of resin coated abrasive grains for use in the manufacture of abrasive articles which comprises first moistening abrasive grains with a liquid plasticizing agent and then adding a dry powdered heat hardenable resin and mixing so as to coat the individual grains with the resin, heating the coated grains in substantially separated condition to fuse the solid resin and cause it to flux with the liquid plasticizing agent and weld into a smooth coating substantially enclosing the individual grains, and then cooling the grains while preventing them from aggregating.

4. The method of making a loose mass of resin coated abrasive grains for use in the manufacture of abrasive articles which comprises first moistening abrasive grains with a normally liquid synthetic resin and then adding a dry powdered heat hardenable resin and mixing so as to coat the individual grains with the resin, heating the coated grains in substantially separated condition to fuse the solid resin and cause it to flux with the normally liquid synthetic resin and weld into a smooth coating substantially enclosing the individual grains, and then cooling the grains while preventing them from aggregating.

5. The method of making resin coated abrasive grains for use in the manufacture of abrasive articles which comprises individually coating abrasive grains with a fusible resin and a liquid plasticizing agent, spreading the coated grains in a substantially single layer, heating to fuse the resin and cause it to weld with the liquid plasticizing agent to form resinous coatings substantially enclosing the individual abrasive grains, and cooling the grains while preventing them from caking together and aggregating to an appreciable extent.

6. The method of making resin coated abrasive grains for use in the manufacture of abrasive articles which comprises individually coating abrasive grains with a fusible resin and a normally liquid synthetic resin, spreading the coated grains in a substantially single layer, heating to fuse the resin and cause it to weld with the normally liquid synthetic resin to form resinous coatings substantially enclosing the individual abrasive grains, and cooling the grains while preventing them from caking together and aggregating to an appreciable extent.

7. The method of making resin coated abrasive grains for use in the manufacture of abrasive articles which comprises adhesively coating the individual abrasive grains with a fusible resin at a temperature below that at which the resin softens, heating the thus coated grains in substantially separated condition to fuse the resin and cause it to form substantially continuous films substantially enclosing the individual grains and then cooling the coated grains while preventing them from aggregating.

8. The method of making resin coated abrasive grains for use in the manufacture of abrasive articles which comprises adhesively coating the individual abrasive grains with a fusible resin, spreading the coated grains in a layer substantially one grain deep, heating to fuse the resin coatings into substantially continuous films around the individual grains, and cooling the coated grains while preventing them from aggregating into a continuous mass.

9. The method of making resin coated abrasive grains for use in the manufacture of abrasive articles which comprises coating individual abrasive grains with a powdered fusible synthetic resin and a plasticizing agent therefor, heating the thus coated grains, while preventing them from aggregating, to fuse the resin and cause it to flux with the plasticizing agent into substantially homogeneous films substantially enclosing the individual grains, and cooling the grains to harden the resinous films while preventing the coated grains from aggregating into a continuous mass.

10. A resin bonded abrasive article comprising abrasive grains and a resinous bond therefor, said bond being the heat hardened product resulting from heating an article formed from a loose mass of abrasive grains individually coated with the bond by mixing the abrasive grains with a liquid plasticizing agent and a dry powdered heat hardenable synthetic resin and then heating the coated grains while keeping them in a substantially separated condition whereby the coatings on the individual grains are fused into films substantially enclosing the individual grains, and then cooling the coated grains while preventing them from aggregating.

11. A resin bonded abrasive article made by molding under pressure and then curing by baking an article formed from a loose mass of resin coated abrasive grains prepared by first coating the abrasive grains with a fusible solid resin and a liquid plasticizing agent and then heating the coated grains, while preventing them from aggregating into a continuous mass, until the resinous coatings on the grains had fused into substantially continuous films about the individual grains, and then cooling the coated grains while preventing them from aggregating.

12. A resin bonded abrasive article made by molding under pressure and then curing by baking an article formed from a loose mass of resin coated abrasive grains prepared by first coating the abrasive grains with a fusible solid resin and a liquid plasticizing agent and then heating the coated grains, spread out in a layer substantially one grain deep, until the resinous coatings on the grains had fused into substantially continuous films about the individual grains and then cooling the coated grains while preventing them from aggregating.

13. A loose mass of abrasive grains individually coated with the solidified product of a heat hardenable synthetic resin and a liquid plasticizing agent fused into a hard substantially dry film substantially enclosing the grain.

14. A loose mass of abrasive grains individually coated with the solidified product of a heat hardenable synthetic resin and a normally liquid synthetic resin fused into a hard substantially dry film substantially enclosing the grain.

15. A resin bonded abrasive article comprising abrasive grains and a resinous bond therefor, said bond being the heat hardened product resulting from heating an article formed from a loose mass of abrasive grains individually coated with the bond by mixing the abrasive grains with a normally liquid synthetic resin and a dry powdered heat hardenable synthetic resin and then heating the coated grains while keeping them in a substantially separated condition whereby the coatings on the individual grains are fused into films substantially enclosing the individual grains and then cooling the coated grains while preventing them from aggregating.

HARRY C. MARTIN.
FREDERICK A. UPPER.